US008245700B2

(12) United States Patent
Middlebrook et al.

(10) Patent No.: US 8,245,700 B2
(45) **Date of Patent: *Aug. 21, 2012**

(54) SUPERCHARGER

(75) Inventors: James K. Middlebrook, Santa Rosa Valley, CA (US); Robert B. Anderson, Ventura, CA (US)

(73) Assignee: Vortech Engineering, Inc., Channel Islands, CA (US)

(*) Notice: Subject to any disclaimer, the term of this patent is extended or adjusted under 35 U.S.C. 154(b) by 33 days.

This patent is subject to a terminal disclaimer.

(21) Appl. No.: 12/828,179

(22) Filed: Jun. 30, 2010

(65) Prior Publication Data

US 2010/0329854 A1 Dec. 30, 2010

Related U.S. Application Data

(63) Continuation of application No. 11/470,114, filed on Sep. 5, 2006, now Pat. No. 7,757,675, which is a continuation of application No. 10/698,192, filed on Oct. 31, 2003, now Pat. No. 7,128,061.

(51) Int. Cl.
*F02B 33/00* (2006.01)
*F04B 17/00* (2006.01)
*F04B 35/00* (2006.01)
*F16C 27/00* (2006.01)

(52) U.S. Cl. ...................... 123/559.1; 417/407; 384/535

(58) Field of Classification Search ............... 123/559.1, 123/559.3; 417/406–407, 362; 384/99, 535
See application file for complete search history.

(56) References Cited

U.S. PATENT DOCUMENTS 2,484,275 A * 10/1949 Eastman ....................... 384/317
2,487,936 A * 11/1949 McCrady et al. .......... 192/70.23
2,585,029 A * 2/1952 Nettel .......................... 192/3.57
2,718,952 A * 9/1955 Thompson ............. 192/105 BA
3,056,634 A * 10/1962 Woollenweber, Jr. et al. ............................ 417/407
3,097,485 A * 7/1963 Bidwell .......................... 60/787
3,460,873 A * 8/1969 Roney ........................... 384/535
4,173,376 A * 11/1979 Standing et al. .............. 384/517
4,460,284 A * 7/1984 Lauterbach et al. .......... 384/905
4,519,747 A * 5/1985 Yamazaki et al. ........ 416/244 A
4,566,810 A * 1/1986 Yoshioka et al. ............. 384/280
4,721,398 A * 1/1988 Miyashita et al. ............ 384/535
4,997,290 A * 3/1991 Aida ............................... 384/99
RE34,276 E * 6/1993 Glaser et al. .................. 417/407
5,549,393 A * 8/1996 Morando ...................... 384/203
5,669,336 A * 9/1997 Williams ................... 123/41.12
5,887,576 A * 3/1999 Wheeler et al. ............ 123/559.1
6,032,466 A * 3/2000 Woollenweber et al. ..... 417/407
6,149,540 A * 11/2000 Johnson et al. ................. 474/14
6,449,950 B1 * 9/2002 Allen et al. ................... 417/407
(Continued)

*Primary Examiner* — Thai Ba Trieu
(74) *Attorney, Agent, or Firm* — Holland & Knight LLP; Richard E. Lyon, Jr.

(57) ABSTRACT

A centrifugal supercharger is provided. One embodiment of the supercharger comprises a two-piece housing wherein a parting area is substantially aligned with a rotational axis of a drive or impeller shaft. Another embodiment comprises a sleeve, or intermediate member disposed substantially between the housing and a bearing assembly(s) located within the supercharger housing. Another embodiment comprises a disengagement device located between the supercharger impeller and the engine. The disengagement device allows selective disengagement of the impeller from the engine. This Abstract is provided for the sole purpose of complying with the Abstract requirement rules that allow a reader to quickly ascertain the subject matter of the disclosure contained therein. This Abstract is submitted with the explicit understanding that it will not be used to interpret or to limit the scope or the meaning of the claims.

14 Claims, 11 Drawing Sheets

U.S. PATENT DOCUMENTS

| | | | | |
|---|---|---|---|---|
| 6,612,015 | B2 * | 9/2003 | Brown | 29/596 |
| 2003/0084888 | A1 * | 5/2003 | LeBold et al. | 123/599 |
| 2003/0121507 | A1 * | 7/2003 | Hasegawa et al. | 123/559.3 |
| 2003/0145656 | A1 * | 8/2003 | Troyer | 73/715 |
| 2003/0179963 | A1 * | 9/2003 | Hokkirigawa et al. | 384/97 |
| 2003/0190242 | A1 * | 10/2003 | Anderson | 417/362 |

* cited by examiner

SUPERCHARGER

CROSS-REFERENCE TO RELATED APPLICATIONS

This is a continuation application of co-pending U.S. application Ser. No. 11/470,114 filed Sep. 5, 2006 entitled "Supercharger," which is a continuation of U.S. application Ser. No. 10/698,192 filed Oct. 31, 2003, entitled "Supercharger," now U.S. Pat. No. 7,128,061, issued Oct. 31, 2006.

FIELD OF THE INVENTION

The present invention generally relates to superchargers. More particularly, the invention concerns a centrifugal supercharger.

BACKGROUND OF THE INVENTION

Superchargers have become pervasive in automobiles, boats, aircraft, and commercial stationary engines as the need to maximize power output has increased due to the use of smaller engines. Centrifugal superchargers employ a high-speed impeller to develop their boost pressure. Although such high-speed machinery places extreme demands on the associated drive machinery, e.g., bearings, seals, shafts, housing components, and the like, centrifugal compressors benefit from very high thermodynamic efficiencies, resulting in optimum engine outputs.

Most centrifugal superchargers employ some sort of speed increasing mechanism to provide the rotation speed for the centrifugal compressor portion of the device to work. This mechanism, which is usually comprised of two parallel shafts with either a belt or gear system connecting them, requires matching cylindrical bores for the shafts and bearings. In the current art, a minimum of two bearing bores and two locating pin bores are machined in each part that comprise the supercharger case and cover, and the two are assembled like two halves of a clam shell, e.g. the separating plane of the individual case components is orthogonal to both shafts. This process requires eight (8) precision boring operations. A significant problem exists in manufacturing the very precise bores of the case components. For example, the accuracy needed to obtain the desired relationship between the two shafts requires true position and parallelism tolerances of 0.0005 inches. These extremely tight tolerances challenge the capabilities of even the newest and best state-of-the-art computer-controlled machining centers. Manufacturing these assemblies requires expensive and time-consuming set-up, machining, measuring and matching procedures. Even with very careful manufacturing procedures, a significant component rejection rate exists, due to parts that do not meet the strict tolerance requirements.

In view of the above, there exists a need for an efficient supercharger that is easy to manufacture and service.

SUMMARY OF THE INVENTION

The present invention provides a very efficient supercharger that is easy to manufacture and service.

One feature of the present invention comprises a supercharger that has a case, or housing that is split into a primary section and a removable section. This two-piece housing greatly enhances and simplifies the ability to attain the required precision manufacturing tolerances.

Another feature of the present invention comprises a sleeve, or intermediate member disposed substantially around a shaft located within the supercharger housing. The intermediate member may be used on the driveshaft, the impeller shaft, or may be used on both shafts. Between the intermediate member and the shaft are bearing assemblies that allow the shafts to rotate. One feature of the intermediate member is that it has a coefficient of thermal expansion (CTE) that is substantially similar to the CTE of the bearing assemblies.

Yet another feature of the present invention comprises a disengagement device located between the supercharger impeller and the engine, or motor that drives the supercharger. The disengagement device allows selective disengagement of the impeller from the engine.

A further feature of the present invention comprises an impeller shaft support designed to reduce mechanical stress and associated rotodynamic instabilities.

Yet another feature of the present invention comprises a supercharger impeller having at least three sets of blades. A first set of primary blades has a first height and a set of secondary, or splitter blades have a second, shorter height. A third set of splitter blades has a third height that is less than the height of the second set of splitter blades.

Another feature of the present invention comprises a supercharger having a modular compressor housing. The modular compressor housing includes two or more modular components. In one embodiment, the compressor housing includes a main housing and a shroud. In other embodiments, the compressor housing includes a main housing, a shroud and a diffuser.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
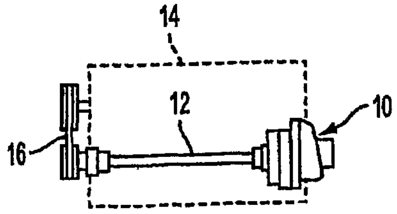
FIG. 1 is a side view showing a supercharger, its driveshaft, and pulley arrangement attached to an engine.

Referring to FIG. 1, a supercharger 10 constructed according to the present invention includes a driveshaft 12 for receiving rotational force from an engine 14 via a pulley and belt assembly 16. More particularly, one end of the driveshaft 12 is attached to supercharger 10 and the opposite end is attached to the pulley and belt assembly 16. In the illustrated embodiment, driveshaft 12 is depicted as relatively long with respect to the other engine components. However, driveshaft 12 may be considerably shorter such that the supercharger is in close proximity to the pulley and belt assembly 16 without departing from the scope of the present invention. Furthermore, driveshaft 12 may by comprised of an additional shaft member with supporting bearing structure such as described in U.S. Pat. No. 6,092,511 without departing from the scope of the present invention.

Figure 2A:
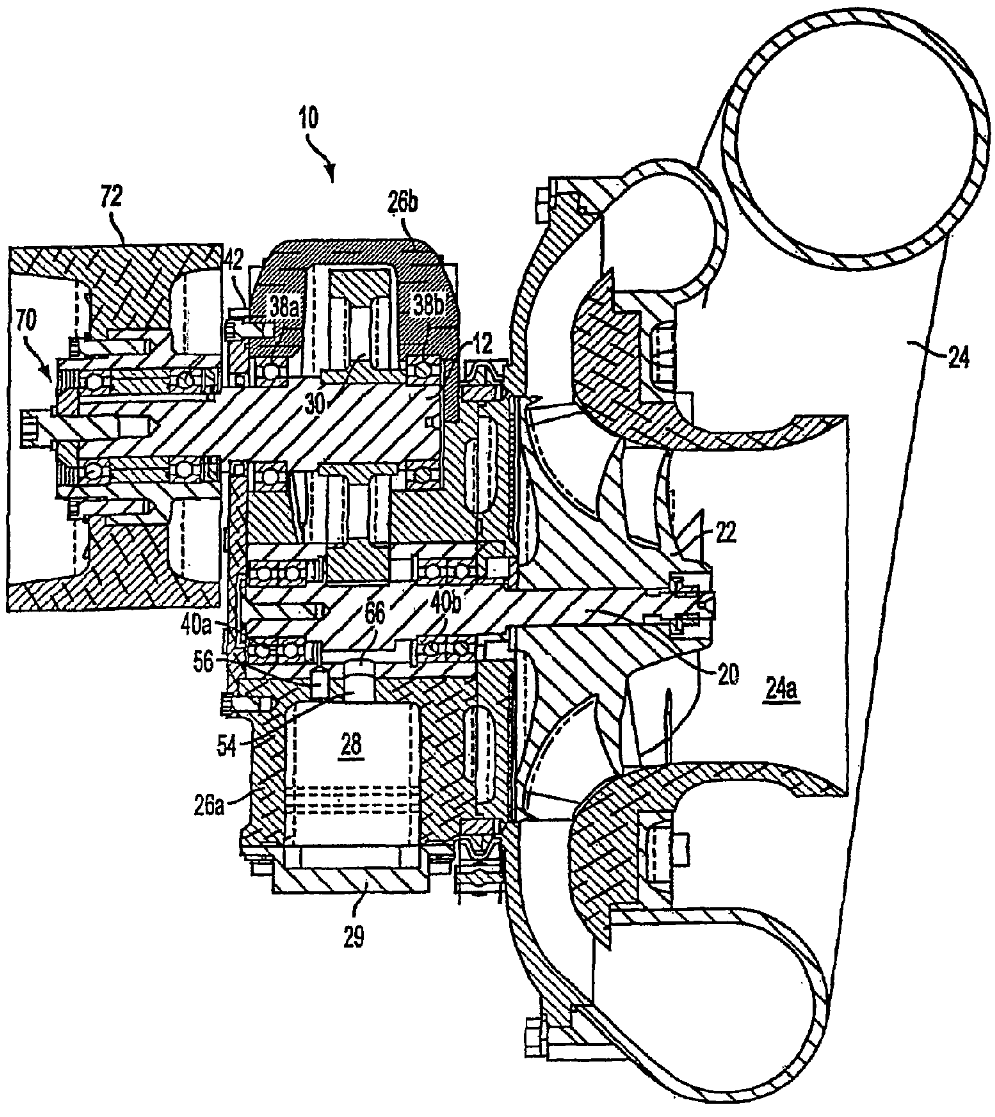
FIGS. 2A and 2B are cross-sectional and exploded views, respectively, of a supercharger in accordance with the principles of the present invention.
Figure 2B:
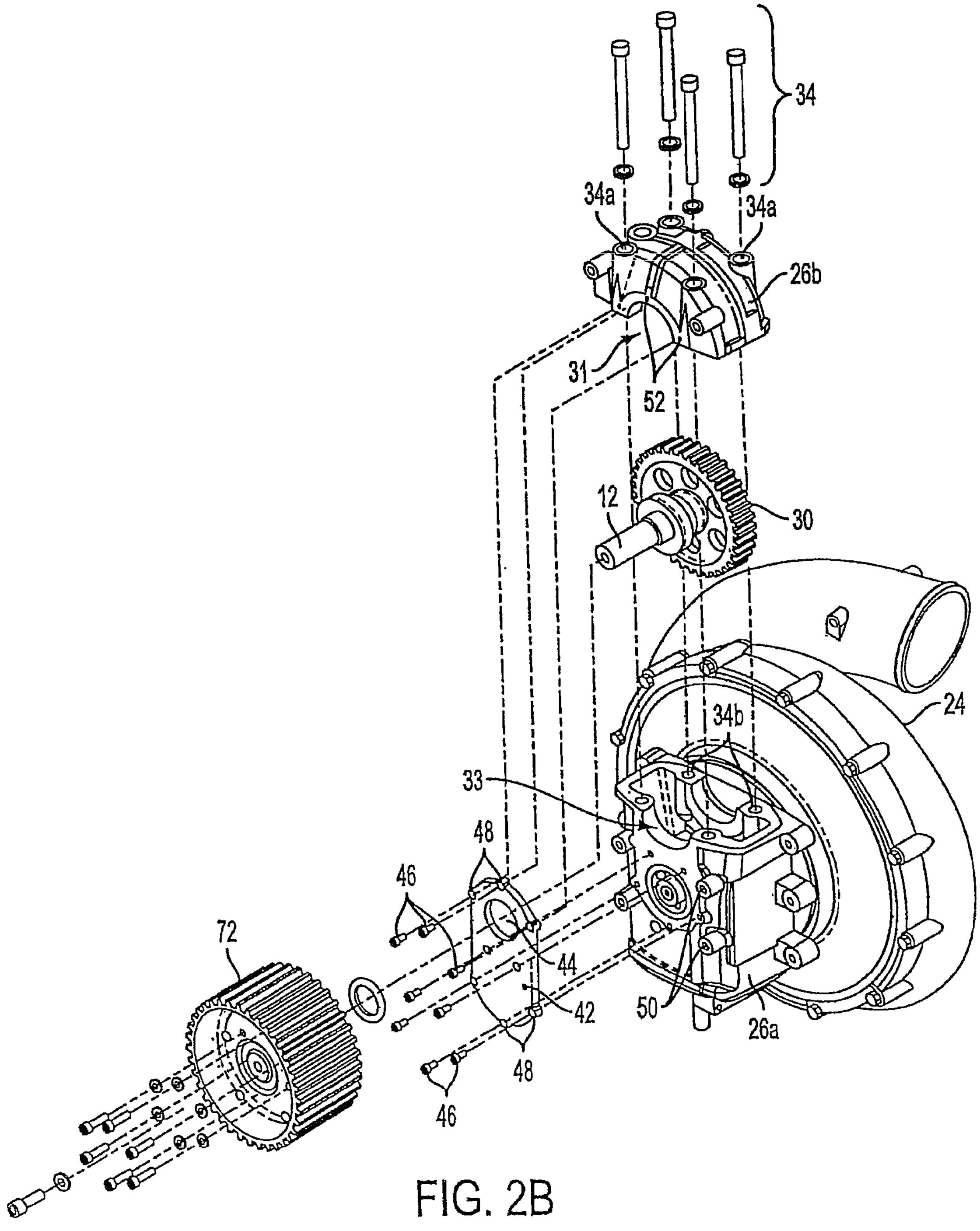

Referring to FIGS. 2A and 2B, supercharger 10 comprises driveshaft 12, impeller shaft 20, impeller 22, compressor housing 24, gear housing 26 and lubrication reservoir 28. In operation, air is drawn through opening 24*a* in the compressor housing 24 and into impeller 22. Impeller 22, in conjunction with the compressor housing 24, compresses the air before discharging it out of the compressor housing 24. Preferably, impeller 22 is designed to discharge the air smoothly into compressor housing 26, without substantial discontinuity or aerodynamic perturbation that may reduce performance.

Driveshaft 12 is mechanically coupled to impeller shaft 20 such that rotation of the driveshaft imparts rotation on the impeller shaft 20, thereby causing rotation of impeller 22. The mechanical coupling between the input drive and impeller shafts includes a drive gear 30 disposed about driveshaft 12 and an impeller gear (not shown) disposed about impeller shaft 20. In a preferred embodiment, the drive gear 30 has a larger circumference than the impeller gear, thereby causing the impeller gear to rotate faster than the drive gear 30.

As shown in FIGS. 2A and 2B, the gear housing 26 defines a chamber that contains the drive gear and impeller gear. Gear housing 26 includes a primary section 26*a* and a removable section 26*b* configured to mate with the lower section. Removable section 26*b* is attached to primary section 26*a* by way of conventional removable fasteners 34 such as screws or bolts, which pass through apertures 34*a* in the removable section and corresponding apertures 34*b* in primary section. Gear housing 26 also contains driveshaft bearing assemblies 38*a*, 38*b* disposed on either side of drive gear 30 and impeller shaft bearing assemblies 40*a*, 40*b* disposed on either side of the impeller gear (not shown). Bearing assemblies 40*a*, 40*b* may comprise single or multiple bearing elements. The bearing elements may be deep-groove or angular contact types, without departing from the scope of this invention. Advantageously, and in the case of multiple angular contact bearing elements, the bearing assemblies 40*a*, 40*b* may be configured in tandem pairs (shown), or may be rigidly preloaded duplex sets, configured in either "DF" or "DB" arrangements.

The impeller gear (not shown) is coupled to impeller shaft 20 such that the rotation of impeller gear imparts rotation to the impeller shaft and impeller 22. Drive gear 30 is connected to driveshaft 12 such that the rotation of drive gear 30 imparts rotation to the impeller shaft 20.

As best seen in FIG. 2B, removable gear housing section 26*b* includes a semicircular recess 31, which, in combination with a corresponding recess 33 in primary gear housing section 26*a*, provides an opening dimensioned for the passage of driveshaft 12. Gear housing 26 is thereby split in two sections along a dividing plane that is substantially parallel with the rotational axis of driveshaft 12. In the illustrated embodiment, the dividing plane is substantially coplanar with the rotational axis of the driveshaft 12. Removing the removable gear housing section 26*b* provides access to driveshaft 12, drive gear 30 and driveshaft bearing assemblies 38*a*, 38*b*. It will be appreciated that the gear housing 26 may be split in any number of different ways. For example, the gear housing 26 maybe split along a dividing plane that is substantially parallel with the impeller shaft 20. Alternatively, the gear housing 26 may be split along multiple dividing planes that may be substantially parallel with both the impeller shaft 20 and the driveshaft 12. Or, the gear housing 26 may be split along other suitable planes.

One feature of this aspect of the invention is that the demanding manufacturing tolerances for the gear housing 26 are much easier to achieve, thereby increasing manufacturability, and decreasing waste generated by parts that are out-of-tolerance. In addition, the number of precision machining operations required to manufacture the gear housing 26 can be significantly reduced, e.g., from 8 individual boring operations to two. Advantageously, this reduces manufacturing costs. In addition, this invention feature adds rigidity to the supercharger 10, and maximizes the manufacturing precision, thereby resulting in improved alignments between gears and shafts for smoother, quieter operation, simplified manufacturing processes, and reduced overall manufacturing costs.

Figure 4A:
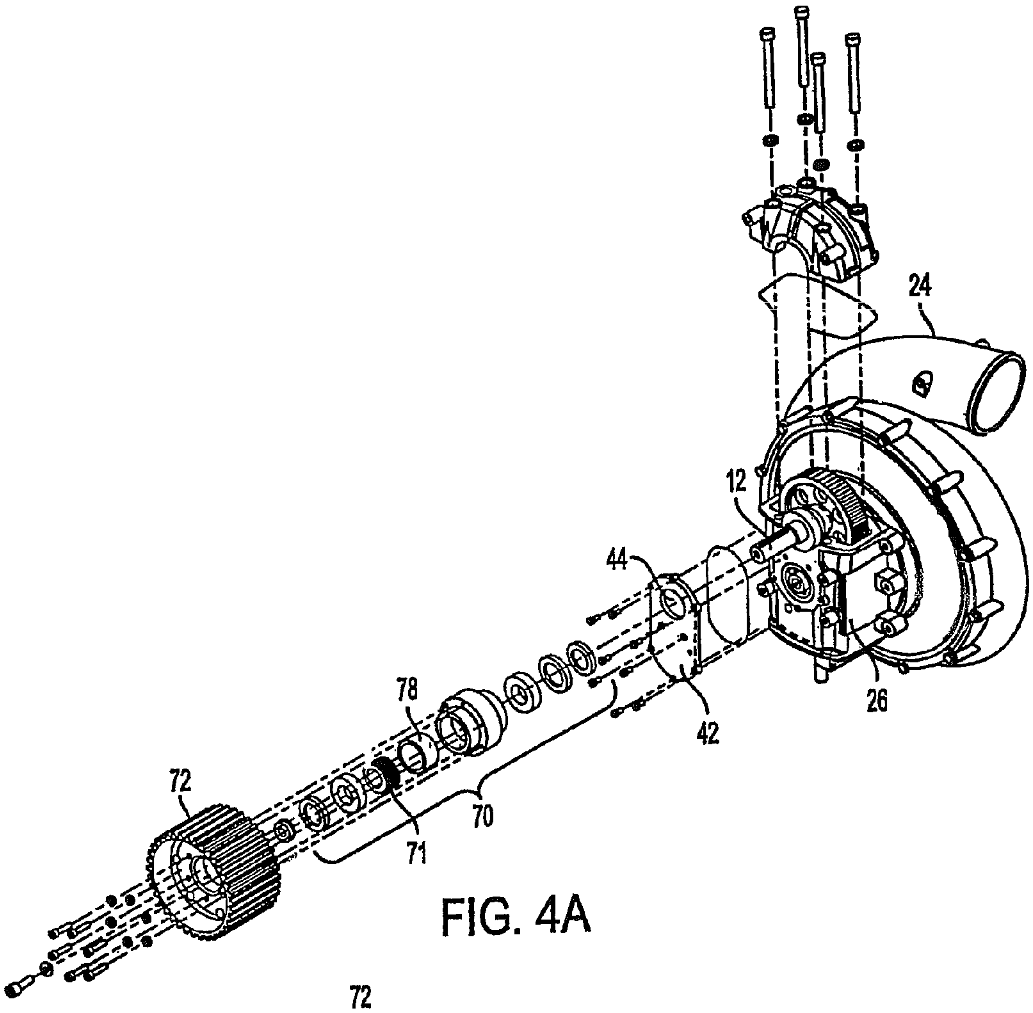
FIGS. 4A and 4B are exploded and cross-sectional views, respectively, depicting a disengagement device for use with the supercharger of the present invention.

Again referring to FIGS. 2A, 2B and 4A, gear housing 26 preferably includes a cover plate 42, that when removed provides access to the impeller shaft 20, impeller gear (not shown) and impeller shaft bearing assemblies 40*a*, 40*b*. The cover plate 42 includes an aperture 44 dimensioned for the passage of the driveshaft. The cover plate 42 is removably attached to the gear housing primary section 26*a* by way of cover plate fasteners 46 such as screws, bolts or equivalents, which pass through cover plate apertures 48, and into corresponding gear housing apertures 50 in the gear housing primary section 26*a*. In addition, the cover plate 42 is attached to the gear housing removable section 26*b* by way of conventional fasteners 46 such as screws, bolts or equivalents, which pass through cover plate apertures 48, and into corresponding gear housing apertures 52 in the gear housing removable section 26*b*.

Some centrifugal superchargers employ the existing lubrication system of the host engine for the supercharger lubrication. However, there exist several advantages of having a self-contained supercharger lubrication system, wherein the supercharger's lubricating fluid is separate from the engine's lubricating fluid. One advantage of a self-contained lubrication system is simplification and ease of installation. Some existing supercharger self-contained lubrication systems utilize a splash system wherein one or more gears are dipped into an oil bath. However, these designs suffer from the disadvantage that built-up heat cannot be discharged.

Referring again to FIG. 2A, according to another embodiment of the present invention, lubrication reservoir 28 is self-contained within the gear housing 26 such that the supercharger 10 does not require lubrication to be drawn from an external source, such as the engine 14. Additionally, in another embodiment of the present invention, the lubrication reservoir 28 is preferably separate and detachable from the gear housing 26, thereby reducing service and repair costs. Lubrication reservoir 28 further includes at least one lubrication inlet 54 and at least one lubrication outlet 56. The lubrication is preferably either in the form of oil, such as engine oil, or in the form of an oil-air mist delivered by appropriate means such as an atomizer (not shown). Advantageously, in a preferred embodiment, hot lubricating fluid is drained into the lubrication reservoir 28 via the lubrication inlet 54 and allowed to cool before being recirculated.

Some superchargers provide an air-assist approach to augmenting lubricating oil circulation within the supercharger gearcase. Generally, the air assist approach results in an air-oil mist lubrication, which aids in achieving reliable operation and the minimization of bearing assembly failure.

In one embodiment of the present invention, the supercharger 10 preferably includes an air assist approach, wherein compressed air from the supercharger 10 is introduced into the lubricating oil by use of a mixing air-assist nozzle assembly (not shown). Such an air-assist assembly may be similar to one described in U.S. Pat. No. 6,293,263. In operation, engine oil, under pressure, mixes with supercharger discharge air, also under pressure, and introduces an air-oil lubricating mist into the supercharger. The lubricating mist is preferably directed towards the supercharger 10 internal gear, shaft, and bearing components.

One advantage of using an oil/air mist is that the oil can be readily sprayed onto the gears and bearings, thereby maximizing gear and bearing life. Further, the pressurized air atomizes the oil and improves distribution and also assists in driving the oil out of the gear housing 26 after use (and into the lubrication reservoir 28), thereby minimizing the oil cycle time in the gear housing 26, and providing improved lubrication and cooling of the gears and bearings.

Figure 2C:
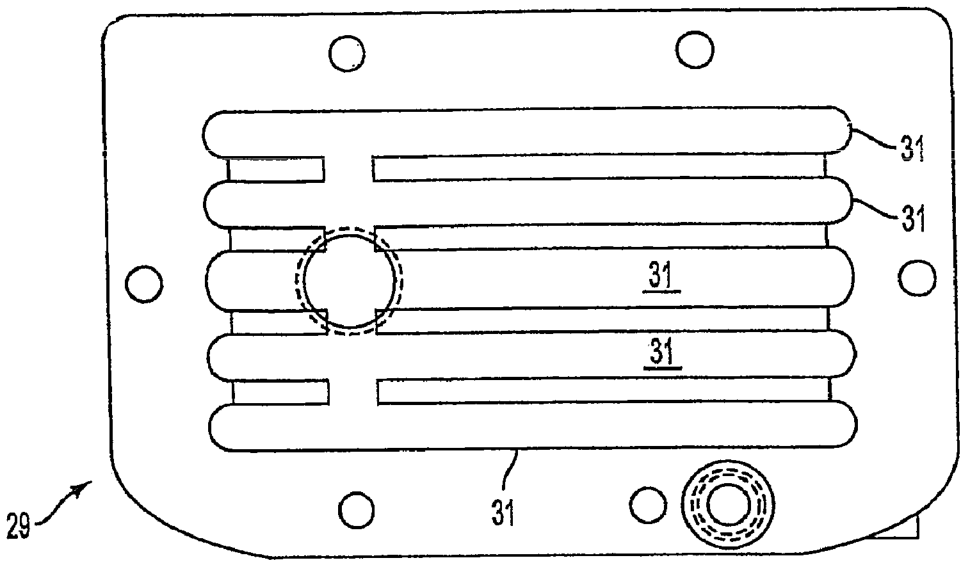
FIGS. 2C and 2D are plan, and elevation views, respectively, of an oil reservoir cover for use with the supercharger of the present invention.
Figure 2D:
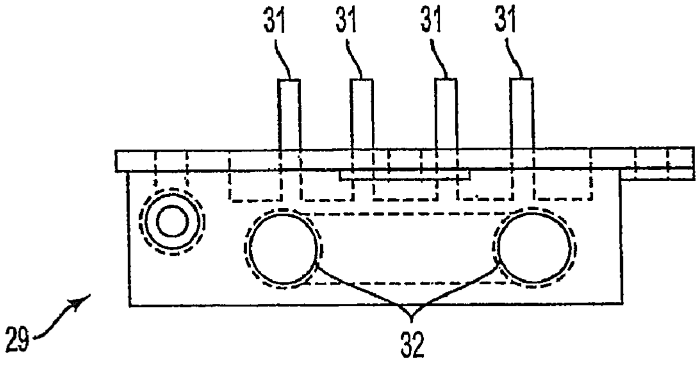

Referring to FIGS. 2A, and 2C-D, some embodiments of the present invention may include a reservoir 28 having a reservoir baseplate 29 that may include inlet and outlet ports 32 for the circulation of cooling fluid or water. As shown in FIG. 2D, such an embodiment incorporates passageways communicating with the inlet and outlet ports 32, but that do not communicate with reservoir 28. The passageways supply cooling fluid to the heat transfer elements 35, that are in contact with any lubricating oil within reservoir 28. The cooling fluid can be provided from a variety of sources including the engine cooling system, or in the case of a marine application, lake or sea water. Advantageously, as shown in FIGS. 2C-D, the heat transfer elements 35, are attached-to or cast-into the baseplate 29 and provide improved cooling performance.

Referring now to FIGS. 3A-D, the precision bearing fit and alignment required for high-speed supercharger operation is often difficult to maintain. One problem stems from the intrinsic difference in the coefficient of thermal expansion (CTE) between the bearing assemblies, which are typically ferrous-based, and the gear housing, which is usually made of aluminum. For example, the CTE for aluminum is relatively high (0.00001244 unit length change, per degree Fahrenheit) when compared to ferrous materials such as cast iron (0.00000655), carbon steel (0.00000533), and 440C stainless steel (0.0000056). Most bearing assemblies, such as those used by the present invention, are comprised of steel or ceramic (Silicon Nitride) rolling elements, retained in angular position and alignment by a cage, and interposed between inner and outer steel races. Typical material of the steel races would be SAE52100 ferrous-based steel, although other ferrous-based materials may be used including 440C, and martensitic Chromium steels with homogeneous carbonitride microstructure.

As shown in FIGS. 3A-D, according to another aspect of the present invention, an intermediate member, sheath, or sleeve 60 is disposed around the impeller shaft bearing assemblies 40*a*, 40*b*. Sleeve 60 preferably comprises a ferrous-based material having a CTE that is substantially similar to the CTE of the bearing assemblies 40*a*, 40*b*. According to some embodiments, the CTE of the sleeve preferably includes a CTE that may range between about 0.000004 and about 0.000007 in/in-° F. (i.e., $4.0\times10^{-6}$, and $7.0\times10^{-6}$ in/in-° F.). Suitable ferrous-based materials for the sleeve 60 include, but are not limited to, grade G2 gray iron, DURA-BAR®, free-machining steels such as 12L14, and all other ferrous-based materials having a CTE that is substantially similar to the CTE of the bearing assemblies 40*a*, 40*b* (DURA-BAR is a registered trademark of Wells Manuf. Co. of Skokie, Ill.).

As shown in FIGS. 3A-D, the sleeve 60 includes an opening 62 for gear engagement. Additionally, the sleeve 60 includes a lubrication conduit 64 in fluid communication with a lubrication oil supply conduit 51, and lubrication apertures 65 in fluid communication with lubrication conduit 64. Lubricating oil may then drain back to reservoir 28 via drain port 66, which is aligned to be in communication with port 54 (shown in FIG. 2A). It will be appreciated that the sleeve, or sheath 60 may comprise any configuration that results in the sleeve, or intermediate member being positioned between the bearing assemblies 40*a*, 40*b* and the gear housing 26. The intermediate-member may also be comprised of more than one component.

According to some embodiments, the intermediate member, or sleeve 60 is pressed or shrink-fitted into the gear housing 26. In other embodiments, sleeve 60 may be installed with a clearance fit into housing 26, and retained thereto by a fastener, or other suitable device.

Figure 3A:
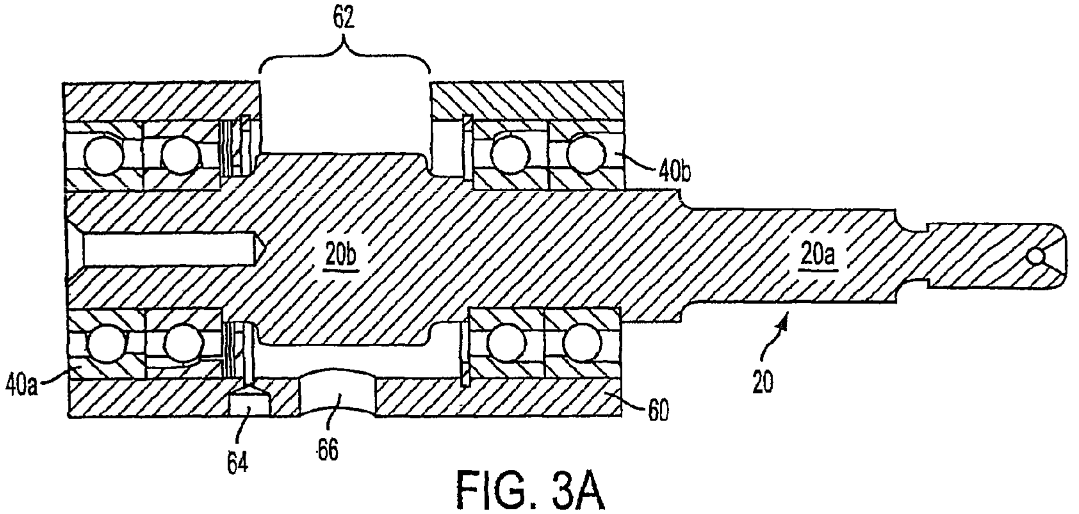
FIGS. 3A and 3B are cross-sectional views of a sleeve assembly for use with the supercharger of the present invention.
Figure 3B:
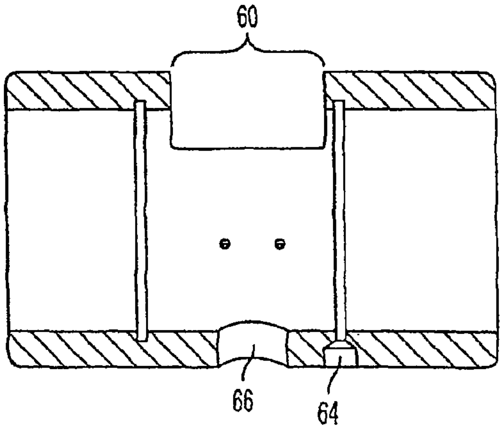
Figure 3C:
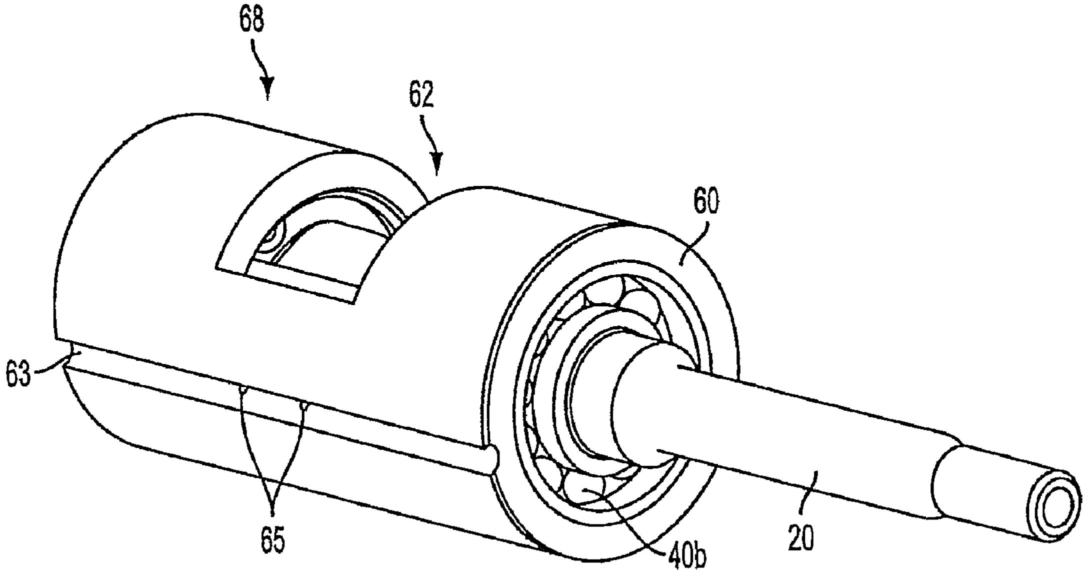
FIG. 3C is an isometric view of an impeller shaft cartridge assembly for use with the supercharger of the present invention.
Figure 3D:
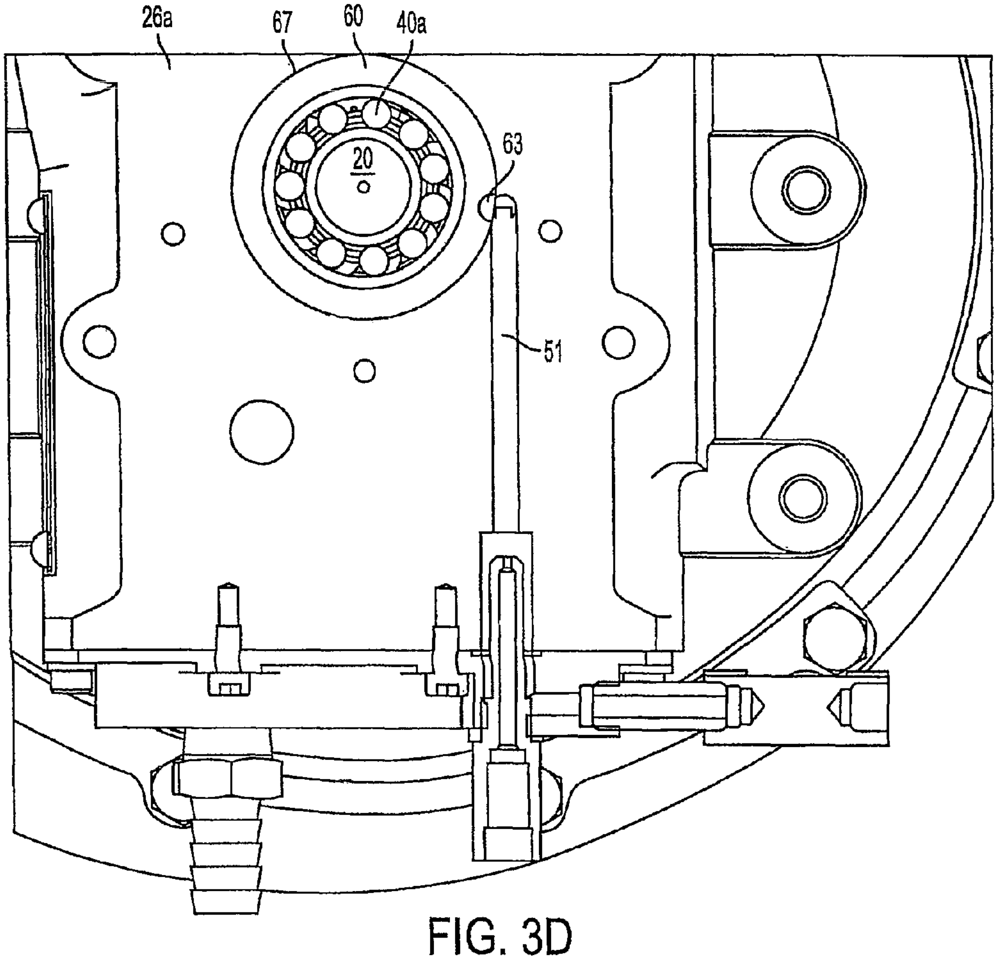
FIG. 3D is cross-sectional view of a portion of the supercharger of the present invention, illustrating a lubrication conduit and an end view of the impeller shaft and sleeve.

Referring now to FIG. 3D, in the illustrated embodiment, a replaceable shaft-bearing cartridge 68 comprises sleeve 60, bearing assemblies 40*a*, 40*b*, and impeller shaft 20. The shaft-bearing cartridge 68 installs into supercharger primary section 26*a* with a slight clearance fit, resulting in an annular gap 67, interposed between sleeve 60 and primary section 26*a*. In one embodiment, the annular gap 67 may range from about 0.0015 inch to about 0.0002 inch. This gap may change with any change in temperature of the sleeve 60 or the primary section 26*a*.

In a preferred embodiment, lubricating oil, supplied under pressure via conduit 51, which is in communication with conduit 63, is forced into annular gap 67 and creates a hydrostatic supporting force, which reacts to gear loads during supercharger 10 operation. Advantageously, this hydrostatic load supporting mechanism also promotes vibration damping characteristics, resulting in quieter operation of the supercharger 10.

One feature of the sleeve 60 is that it maintains the bearing assemblies 40*a*, 40*b* securely in the gear housing 26 during a range of supercharger 10 operating temperatures. More importantly, the fit between bearing races 40*a*, 40*b* and sleeve 60 are maintained regardless of operating temperature. This is achievable because the CTE's of the sleeve 60 and the bearing assemblies 40*a*, 40*b* are substantially matched, thereby expanding and contracting in unison. This feature is especially beneficial to the high-speed impeller shaft 20 bearings 40*a*, 40*b*, which may operate at speeds exceeding 60,000 RPM. It will be appreciated that a sleeve(s) 60 may also be placed around the driveshaft bearing assemblies 38*a*, 38*b*.

Referring now to FIG. 3C, the shaft-bearing cartridge 68 may be employed as an insertable device that lends itself to manufacturing and assembly advantages in addition to the aforementioned thermal stability advantage. For example, the shaft-bearing cartridge 68 permits pre-assembly which allows it to be inserted and/or removed as a single unit, thereby reducing service and repair costs. Additionally, the use of a pre-assembled, replaceable shaft-bearing cartridge 68 allows repairs to be performed in the field.

Figure 4B:
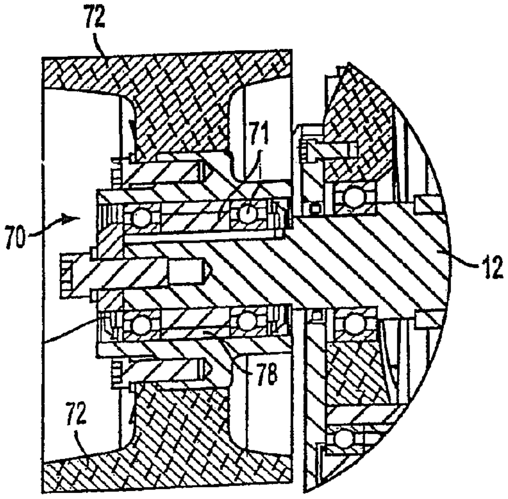
Figure 4C:
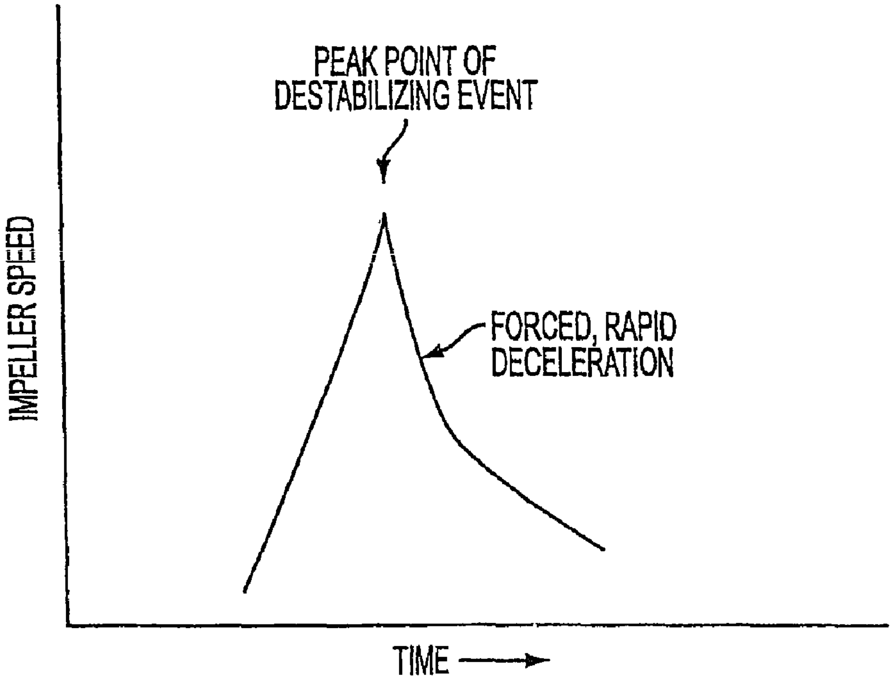
FIG. 4C illustrates a graph of an impeller shaft acceleration/deceleration rate of a conventional supercharger.
Figure 4D:
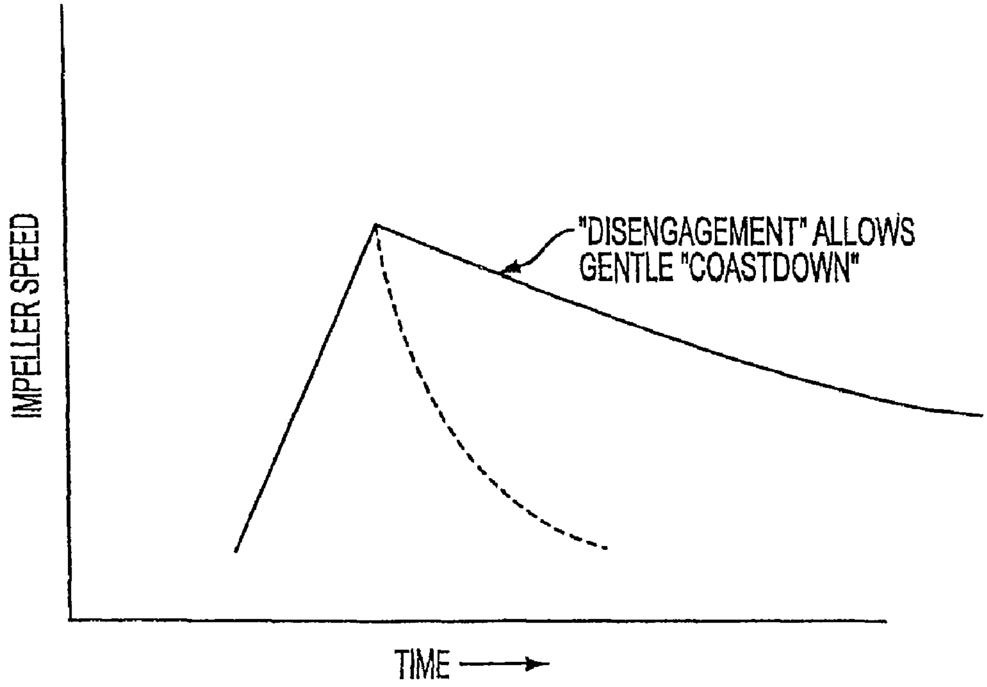
FIG. 4D illustrates a graph of an impeller shaft acceleration/deceleration rate of a supercharger constructed according to one embodiment of the present invention.

Referring to FIGS. 4C-D, superchargers can experience very fast drive- and impeller shaft acceleration rates. The acceleration rates are amplified by the step-up ratio between the driveshaft 12 and the impeller shaft 20, which is typically in the range of 3:1 to 5:1 (i.e., 3 to 1 and 5 to 1). That is, the impeller shaft 20 may rotate five times faster than the driveshaft 12. High acceleration and deceleration forces, generally caused by "blipping" the engine, can stress the impeller shaft 20 and its related components, and cause de-stabilizing effects of bearings 40*a*, 40*b*, sufficient to cause catastrophic failure. However, the most severe stresses and bearing instabilities generally occur during the transition from very high to relatively slow impeller shaft 20 rotational speeds. An extreme example would be a very rapid rotational acceleration immediately followed by a very rapid deceleration. Such an acceleration rate with the peak point of destabilization is depicted in FIG. 4C.

Again referring to FIGS. 4A and 4B, according to another feature of the present invention, the supercharger 10 preferably includes a disengagement device 70 for disengaging the impeller 22 from the engine 14. In the illustrated embodiment, the driveshaft 12 is disengageable from the engine 14. As best seen in FIG. 4B, the disengagement device 70 is disposed between the driveshaft 12 and the primary drive pulley 72. According to some embodiments, the disengagement device 70 comprises a one-way clutch, such as a sprag, overrunning clutch, or other suitable device. In a preferred embodiment, the disengagement device 70 is preferably integrated into the primary drive pulley 72, which may also comprise part of belt and pulley system 16, as described in FIG. 1.

As shown in FIG. 4B, in a preferred embodiment, the disengagement device 70 comprises a sprag clutch 71 located between the primary drive pulley 72 and the driveshaft 12. A sprag clutch employs sprags (not shown), that due to their oblong shape, wedge between driveshaft 12 and the outer sprag bearing race 78, when rotation occurs in a first direction, but allow driveshaft 12 and outer sprag race 78 to move independently of each other when rotation occurs in the opposite direction. Furthermore, upon rapid deceleration of the primary drive pulley 72 rotational speed, the sprag clutch 71 disengages and allows driveshaft 12, drive gear 30, impeller shaft 20, and impeller 22 to overrun and gently coast to a reduced rotational speed. As shown in FIG. 4D, the feature of the present invention dramatically reduces the peak destabilizing event, or rapid deceleration. The wedging action of the sprags locks driveshaft 12 and the outer sprag bearing races 78 together, thereby enabling the transfer of rotational force, or torque between the engine 14 and the driveshaft 12.

By way of example, a FORMSPRAG® sprag clutch (part number CL42875) can be used as the clutch in the present invention (FORMSPRAG is a registered trademark of Dana Corporation of Toledo, Ohio). Of course, other types of clutches, including, but not limited to roller clutches, spring clutches, centrifugal clutches, friction clutches, non-friction clutches, mechanical clutches, pneumatic clutches, hydraulic clutches, electrical clutches, diaphragm clutches and hysteresis clutches, can be employed without departing from the scope of the present invention. It will be appreciated that the disengagement device 70 may be located anywhere between the engine 14 and the impeller 22. For example, the disengagement device 70 may be located between the driveshaft 12 and the impeller shaft 20, or between the impeller shaft 20 and the impeller 22.

According to other embodiments, the disengagement device 70 may comprise a speed-sensitive engagement mechanism such as a traditional centrifugal clutch. Alternatively, the disengagement device 70 may comprise both a speed-sensitive engagement feature and an overrunning or disengaging feature. Advantageously, the speed-sensitive engagement feature permits the supercharger 10 to be substantially disengaged from the engine 14 during very low speed operation and engine idle, when supercharger 10 noise maybe objectionable.

High-performance superchargers (such as for competitive drag racing applications) require high rotational speeds that create high air-flow and pressure ratios, thereby creating significant rotordynamic problems and challenges. One such problem is the inherent lack of stiffness at the impeller-to-impeller shaft shoulder connection point. In a typical supercharger, the impeller abuts against a spacer, which in turn abuts against a shoulder on the impeller shaft. The diameter of the impeller shaft shoulder is normally only slightly larger than the diameter of the impeller shaft, thereby resulting in a relatively low bending stiffness in the region between the impeller and the adjacent support bearing. Low stiffness in this region may result in impeller shaft bending at rotational speeds that are within the range of the supercharger's high-speed operation, giving rise to rotordynamic critical speeds, identified by dynamic instabilities and/or excessive vibration. Excessive impeller shaft bending and associated dynamic instabilities frequently results in the impeller contacting the compressor housing, causing catastrophic failure of the impeller.

Figure 5A:
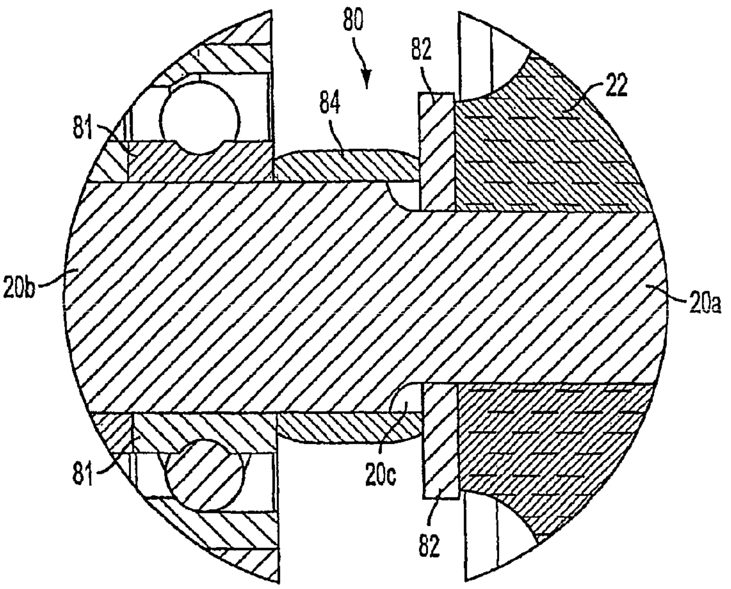
FIGS. 5A and 5B are cross-sectional views of a spacer assembly for use with the supercharger of the present invention.
Figure 5B:
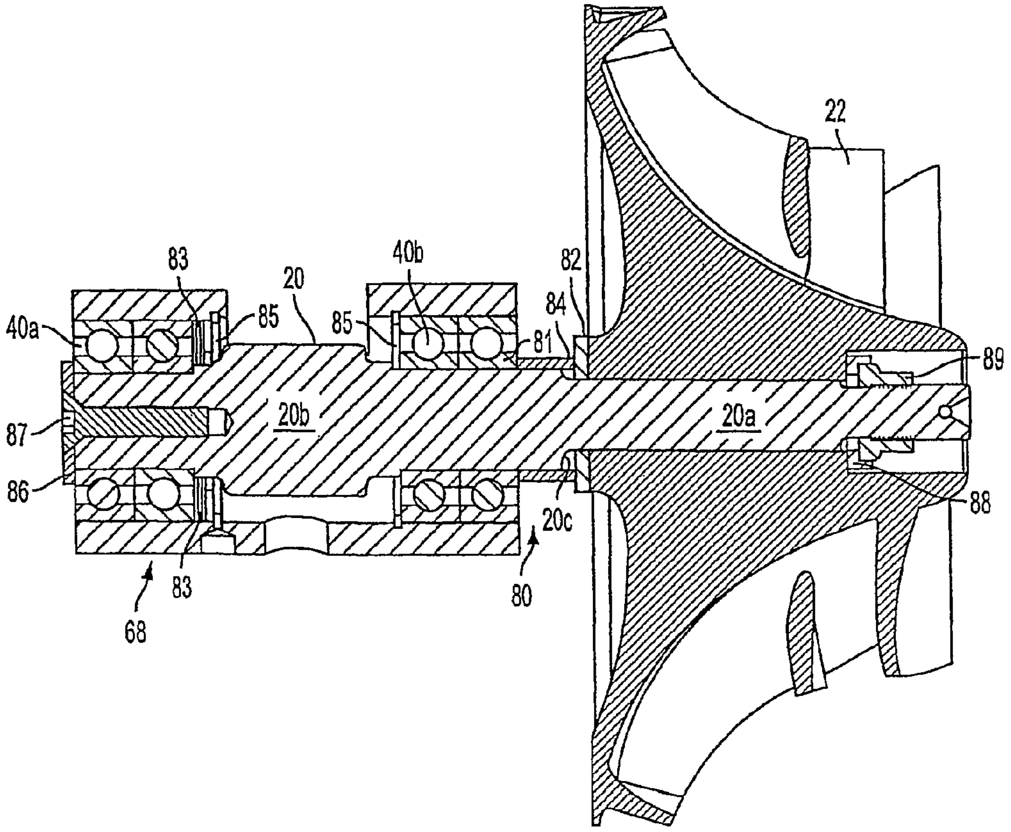

Referring to FIGS. 5A and 5B, another feature of the present invention is illustrated. A spacer assembly 80 is disposed around the impeller shaft 20 between the impeller 22 and the impeller shaft inner bearing race 81. The impeller shaft 20 comprises a distal section 20*a*, which is adjacent to the impeller 22, and has a first diameter. A proximal section 20*b* is adjacent to the impeller shaft inner bearing race 81, and has a second, larger diameter. The first and second impeller shaft sections 20*a*, 20*b* meet at a transition section 20*c*. The spacer assembly 80 comprises a tubular spacer 84 disposed between the impeller 22 and the transition section 20*c* and an impeller spacer 82 disposed between the tubular spacer 84 and the base of the impeller 22. The two spacers 82, 84 mechanically couple the distal impeller shaft section 20*a* to the impeller shaft inner bearing race 81, resulting in a much stiffer construction and a significant reduction in vibration between components. Put differently, the tubular spacer 84 adds additional support to the distal impeller shaft section 20*a* by contacting, and supporting the impeller spacer 82 at a diameter that is approximate to the diameter of the impeller shaft inner bearing race 81.

As best seen in FIG. 5A, transition section 20*c* preferably comprises a curvilinear taper providing a gradual transition between the first and second impeller shaft sections. In the illustrated embodiment, transition section 20*c* is substantially concave. However, as would be understood to those of ordinary skill in the art, transition section 20*c* may also be substantially convex or substantially straight, without departing from the scope of the present invention. Advantageously, the transition section 20*c* is configured to significantly reduce impeller shaft stress at critical rotational speeds. More particularly, the tubular spacer 84 allows the transition section 20*c* to be shaped in a preferred configuration, e.g., a fillet with generous radius, thereby dramatically increasing the fatigue resistance of the impeller shaft 20. This is because the transition section 20*c* can be shaped to minimize localized stresses, thereby eliminating or minimizing the formation of fatigue cracks.

Referring now to FIG. 5B, other advantages of replaceable shaft-bearing cartridge 68 become apparent. In this preferred embodiment, bearings 40*a*, 40*b* are of the angular contact type, and are mounted as duplex tandem pairs, known in the art as "DT", with the pairs, in turn mounted "back-to-back" to each other. Bearings 40*a* are firmly retained to impeller shaft 20 proximal section 20*b* by retaining washer 86 and threaded fastener 87, which engages a mating threaded receptacle in proximal section 20*b*. Bearings 40*b* are retained by spacers 84, 82, impeller 22, washer 88 and impeller fastener 89, which engages a mating threaded portion of distal section 20*a*. Preferably, a static preload force should be applied in order to maintain stability of 40*a*, 40*b*. Preload is provided by spring elements 83, which generate a preload force against retainers 85. In this preferred embodiment, the preload force may range from about 50 lbf to about 400 lbf.

Alternative embodiments are also possible, and these are described and incorporated herein as within the scope of the present invention. In one such embodiment, angular contact bearings 40*a*, 40*b* may be configured as rigidly preloaded duplex sets, and mounted either back-to-back (known in the art as "DB") or face-to-face (known in the art as "DF"). Advantageously, the clamping forces acting on bearings 40*a*, 40*b* inner races are developed by threaded fastener 87 and impeller fastener 89, which in turn enable the rigid preloading of bearings 40*a*, 40*b*.

Figure 6A:
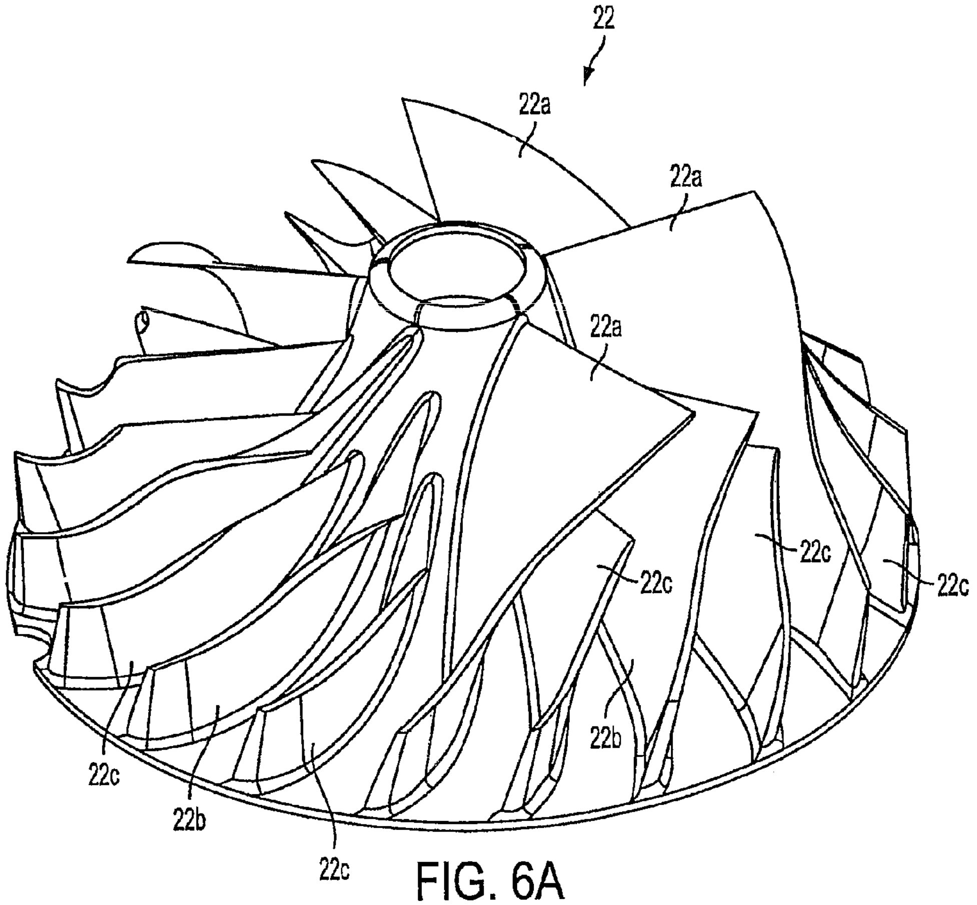
FIGS. 6A and 6B are perspective and side views, respectively, of an impeller for use with the supercharger of the present invention.
Figure 6B:
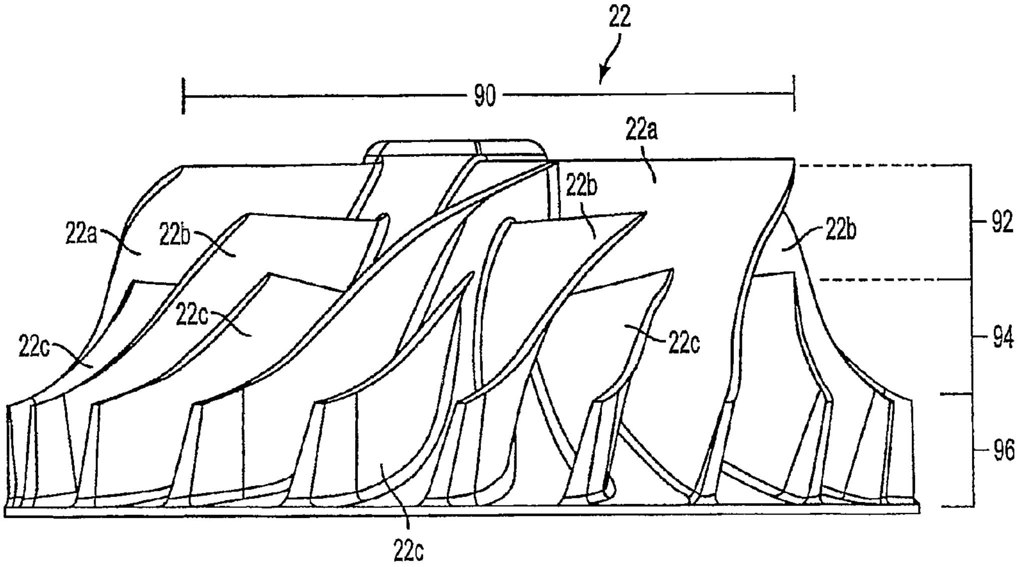

Referring now to FIGS. 6A and 6B, high performance superchargers often have air, or gas flow rates that exceed 200 lbm/min. and pressure ratios exceeding 3.0 (i.e., pressures greater than three times ambient atmospheric pressure). Of course, this places extraordinary demands on most centrifugal superchargers and their associated impellers. Proper impeller design is critical for the overall performance of the supercharger. A primary impeller design challenge involves attaining sufficient airflow performance without resorting to undesirable designs. An example of an undesirable design is an impeller having excessively large passageways, which preclude aerodynamic choke, but result in poor blade loading and other deleterious effects.

On one hand, it is desirable to have a low blade count at the impeller inlet to decrease aerodynamic blockage and increase airflow. On the other hand, in order to increase impeller efficiency, a high blade count is preferred further along the airflow passageway (especially near the impeller outlet). Such a design allows the specific impeller work (e.g., total work per unit blade) to be reduced, thereby reducing blade loading effects to more efficient levels.

Referring to FIGS. 6A and 6B, another feature of the present invention is illustrated. An impeller 22 suitable for use with the supercharger 10 is shown. Impeller 22 preferably comprises at least three sets of blades including primary blades 22*a*, secondary blades 22*b*, and tertiary blades 22*c*. In the illustrated embodiment, the impeller 22 comprises a set of primary blades 22*a* having a first height, a set of secondary blades 22*b* having a second height, and a set of tertiary blades 22*c* having a third height. The blade heights are configured such that the first height is greater than the second height, which is greater than the third height. As would be understood to those of ordinary skill in the art, the impeller 22 may consist of additional or fewer sets of blades having different heights without departing from the scope of the present invention.

As depicted in FIG. 2A, air or other gasses are drawn into the impeller through opening 24*a* in the compressor housing 24. Referring to FIG. 6B, the air enters the impeller 22 through the inlet region 90, which has a relatively low blade count since the secondary blades 22*b* and tertiary blades 22*c* do not extend up to the top of the impeller 22. The air is compressed as it travels through a middle region 92 having a relatively medium blade count and a lower region 94 having a relatively high blade count since all three sets of blades extend through this region.

Specifically, in a preferred embodiment (as shown in FIGS. 6A and 6B) of the present invention, the impeller 22 would include five primary blades 22*a*, five secondary blades 22*b*, and 10 tertiary blades 22*c*. Alternative embodiment impellers 22 may have a range of 3 to 9 primary blades 22*a*, with 3 to 9 secondary blades 22*b*, and 6 to 18 tertiary blades 22*c*. It will be appreciated that other blade numbers and/or arrangements may be employed without departing from the scope of the present invention.

One feature of this aspect of the invention is that the relatively low blade count within inlet region 90 induces a low density air flow that minimizes aerodynamic blockage. Conversely, the relatively high blade count within outlet region 96 provides excellent aerodynamic performance by minimizing blade loading.

Figure 7A:
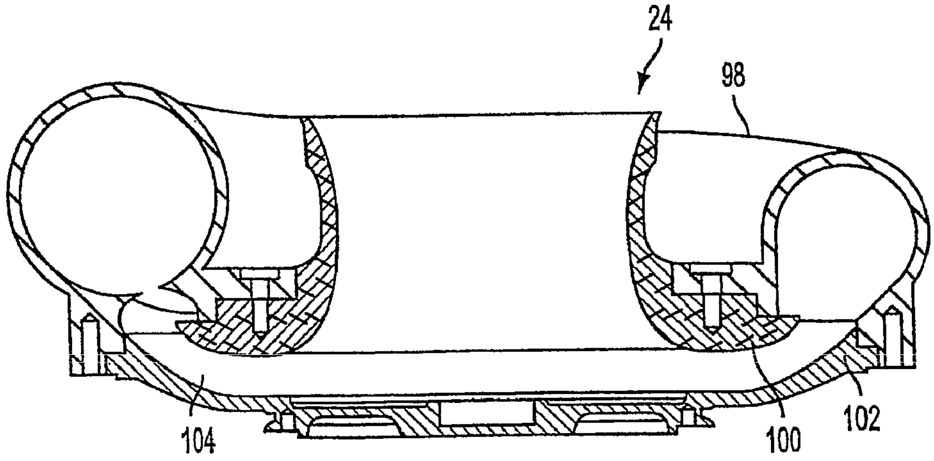
FIGS. 7A and 7B are side and exploded views, respectively, of a modular compressor housing for use with the supercharger of the present invention.
Figure 7B:
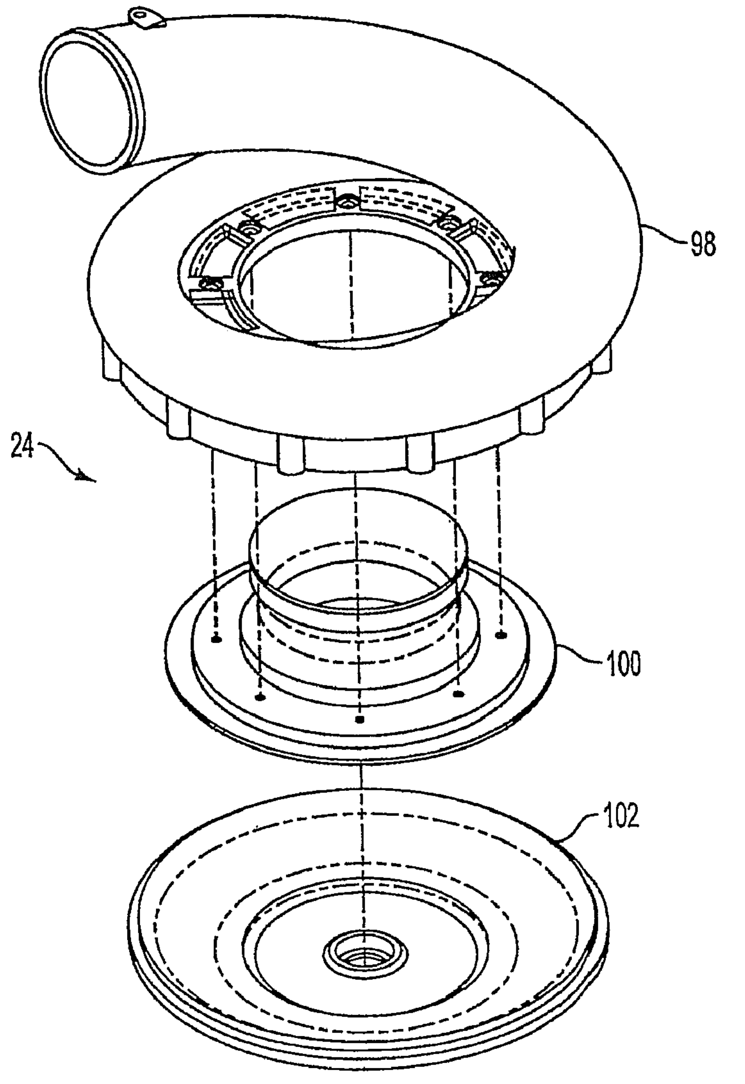

Referring now to FIGS. 7A and 7B; centrifugal compressors for superchargers commonly employ an exit assembly such as a compressor housing or volute. Compressor housings are often complex structures that pose both design and manufacturing difficulties. By way of example, one manufacturing problem involves providing access to the inner flow path passage for cleaning (e.g., polishing) and/or maintenance. Other manufacturing problems relate to installing and supporting the core in the mold when casting the compressor housing. Complex cores result in unacceptably high reject rates, but simpler cores limit design options in the critical diffuser region.

As shown in FIGS. 7A and 7B, another feature of the present invention is illustrated. A modular compressor housing 24 suitable for use with the supercharger 10 is depicted. The modular compressor housing 24 comprises at least two modular components as opposed to a single casting. In the illustrated embodiment, modular compressor housing 24 comprises three modular components including a main housing or scroll 98, a shroud 100 and a backplate 102. As an assembly, shroud 100 and backplate 102 form an annular space or diffuser passageway 104. Alternatively, two of the three components can be combined into a single component, thereby forming a, modular compressor housing 24 having two components. For example, the shroud 100 and scroll 98 may be combined into a single component.

As shown in a preferred embodiment of FIG. 7A, diffuser passageway 104 is curved approximately 45° toward the axial direction, resulting in a more compact overall dimension of compressor housing 24. Advantageously, curved diffuser passageway 104 affords a reduction in compressor housing 24 dimension without unduly shortening the length of diffuser passageway 104. Shortening the length of the diffuser passageway reduces the maximum pressure recovery attainable from the diffuser, which deleteriously affects performance of the compressor stage. The amount of curvature toward the axial may range from 20° to 60° without departing from the scope of this feature of the invention.

Referring to FIG. 7B, shroud 100 may be cast and machined separately and attached to the main housing 98 using fasteners such as screws, bolts, or other suitable fasteners. The backplate 102 may be attached to the main housing 98 by way of force-fit or friction fit, thereby covering the shroud 100. Alternatively, the backplate 102 may be attached using suitable removable fasteners. Advantageously, by removing the backplate 102 and shroud 100 components, the interior of the compressor housing 24 is accessible for blending, de-burring, polishing, cleaning, and/or maintenance. Additionally, the compressor housing 24 may incorporate alternative diffusers including, but not limited to, vaneless diffusers, channel or wedge diffusers and low-solidity vane diffusers. Advantageously, the modular design of the compressor housing 24 permits different diffusers to be installed, thereby enabling compressor "tuning." This reduces the number of parts that must be maintained in stock, thus reducing costs. Also advantageously, the modular design affords ease of manufacture of the curved diffuser passageway 104.

Thus, it is seen that a centrifugal supercharger is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A supercharger having an impeller shaft defining a proximal section, a distal section of a reduced diameter and a transitional section disposed therebetween, an impeller directly mounted on the distal section of the impeller shaft and at least one bearing assembly positioned about a portion of the proximal section of the impeller shaft, the improvement comprising a spacer assembly positioned circumferentially on the impeller shaft between the impeller and the bearing assembly, said spacer assembly comprising a first tubular spacer and a second spacer, said first tubular spacer being positioned about a second portion of said proximal section of the impeller shaft and said transitional section thereof and bearing against said bearing assembly and said second spacer, said second spacer being separable from said first tubular spacer and positioned adjacent to and bearing against a base of the impeller whereby said spacer assembly provides stiffening support for said impeller shaft proximate said transitional section thereof.

2. The supercharger of claim 1, wherein said spacer assembly is structured to couple said impeller to said bearing assembly.

3. The supercharger of claim 1, wherein the axial length of said first tubular spacer is substantially greater than the axial length of said second spacer.

4. The supercharger of claim 1, wherein the axial length of said first tubular spacer is substantially greater than the axial length of said second spacer and wherein the radial length of the portion of said second spacer bearing against said impeller is substantially greater than the radial length of said first tubular spacer bearing against said bearing assembly.

5. A supercharger, comprising:

a rotatable shaft;

at least one bearing assembly disposed around a portion of the rotatable shaft, said bearing assembly being constructed of a first material having a predetermined coefficient of thermal expansion;

a housing surrounding the bearing assembly, said housing being constructed of a second material having a coefficient of thermal expansion different from said coefficient of thermal expansion of said first material; and an intermediate member formed of a ferrous based material and disposed in a stationary disposition between the bearing assembly and the housing, separate from and adjacent to said bearing assembly and proximate said housing, said intermediate member being constructed of a material having a coefficient of thermal expansion substantially similar to the coefficient of thermal expansion of said first material whereby alignment of said bearing assembly with respect to the rotating shaft is maintained during high speed operation of the supercharger.

6. The supercharger of claim 5, wherein the ferrous based material is selected from a group consisting of: a gray iron, a G2-grade gray iron, a DURA-BAR, a free machining steel, a 12L14 steel, a 1018 steel, a ferrous based iron, a steel, and a steel alloy.

7. The supercharger of claim 5, wherein the material of which said intermediate member is constructed has a coefficient of thermal expansion that may range between about 0.000004 and 0.000007 in/in-° F.

8. The supercharger of claim 5, wherein the intermediate member is selected from a group consisting of: a sleeve, and a sheath.

9. The supercharger of claim 5, wherein the housing is comprised of aluminum.

10. The supercharger of claim 5, wherein the rotatable shaft, bearing assembly, and intermediate member comprise a thermally stable replaceable cartridge assembly.

11. A supercharger, comprising:

a rotatable shaft;

at least one antifriction bearing assembly disposed around a portion of the rotatable shaft, said antifriction bearing assembly being constructed of a first material having a predetermined coefficient of thermal expansion;

a housing surrounding the antifriction bearing assembly, said housing being constructed of a second material having a coefficient of thermal expansion different from said coefficient of thermal expansion of said first material; and an intermediate member formed of a ferrous based material and disposed in a stationary disposition between the antifriction bearing assembly and the housing, separate from and adjacent to said antifriction bearing assembly and proximate said housing, said intermediate member being constructed of a material having a coefficient of thermal expansion substantially similar to the coefficient of thermal expansion of said first material whereby alignment of said antifriction bearing assembly with respect to the rotating shaft is maintained during high speed operation of the supercharger.

12. The supercharger of claim 11, wherein the material of which said intermediate member is constructed has a coefficient of thermal expansion that may range between about 0.000004 and 0.000007 in/in-° F.

13. The supercharger of claim 11, wherein the intermediate member is selected from a group consisting of: a sleeve, and a sheath.

14. The supercharger of claim 11, wherein the housing is comprised of aluminum.

* * * * *